US012418749B2

(12) United States Patent
Yang et al.

(10) Patent No.: US 12,418,749 B2
(45) Date of Patent: Sep. 16, 2025

(54) SOUNDING DEVICE

(71) Applicants: AAC Microtech (Changzhou) Co., Ltd., Changzhou (CN); AAC ACOUSTIC TECHNOLOGIES (SHENZHEN) CO., LTD., Shenzhen (CN)

(72) Inventors: Huhu Yang, Shenzhen (CN); Wei Wei, Shenzhen (CN); Zhaoyu Yin, Shenzhen (CN); Zhizhu Chen, Shenzhen (CN)

(73) Assignees: AAC Microtech (Changzhou) Co., Ltd., Changzhou (CN); AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 338 days.

(21) Appl. No.: 18/095,537

(22) Filed: Jan. 11, 2023

(65) Prior Publication Data

US 2023/0328447 A1 Oct. 12, 2023

(30) Foreign Application Priority Data

Apr. 6, 2022 (CN) ......................... 202210352641.8

(51) Int. Cl.
*H04R 9/04* (2006.01)
*H04R 7/12* (2006.01)
*H04R 9/02* (2006.01)

(52) U.S. Cl.
CPC ............. *H04R 9/025* (2013.01); *H04R 7/127* (2013.01)

(58) Field of Classification Search
CPC . H04R 9/02; H04R 9/04; H04R 9/041; H04R 9/043; H04R 9/045; H04R 9/046; H04R 2400/11
See application file for complete search history.

(56) References Cited

U.S. PATENT DOCUMENTS

| | | | | |
|---|---|---|---|---|
| 10,003,887 | B2 * | 6/2018 | Linghu | H04R 7/127 |
| 10,250,989 | B1 * | 4/2019 | Xiao | H04R 23/008 |
| 10,820,107 | B2 * | 10/2020 | Feng | H04R 9/041 |
| 10,979,823 | B2 * | 4/2021 | Song | H04R 1/2811 |
| 11,617,040 | B2 * | 3/2023 | Tao | H04R 9/046 381/398 |
| 2009/0136065 | A1 * | 5/2009 | Yano | H04R 9/10 381/186 |
| 2020/0213752 | A1 * | 7/2020 | Xiao | H04R 7/12 |
| 2023/0100237 | A1 * | 3/2023 | Xiao | B06B 1/045 381/412 |

* cited by examiner

*Primary Examiner* — Ryan Robinson
(74) *Attorney, Agent, or Firm* — Wiersch Law Group

(57) ABSTRACT

The present disclosure provides a sounding device. The sounding device includes a vibration system, a magnetic circuit system, a conductive element and a fixed element. The vibration system includes a diaphragm and a voice coil fixed to the diaphragm. The sounding device also includes a reinforcement element for fixing the voice coil and the connection part. The reinforcement element includes a first reinforcement part fixed to the upper surface of the connection part or the lower surface of the connection part, and a second reinforcement part fixed to the outer side surface of the voice coil. Compared with the related art, the sounding device provided by the present disclosure has a simple structure and good reliability.

9 Claims, 4 Drawing Sheets

A-A

SOUNDING DEVICE

FIELD OF THE PRESENT DISCLOSURE

The present disclosure relates to the field of electro-acoustic transducers, and in particular relates to sounding device.

DESCRIPTION OF RELATED ART

In recent years, with the rapid development of mobile communication technology, consumers are increasingly using mobile communication devices with voice functions. Examples are portable telephones, handheld game consoles, laptop computers, laptop computers, multimedia players, and other devices capable of communicating over public or private communication networks. As the sounding device is used as a voice playback device, its design directly affects the performance of the mobile communication device.

In the related art, the sounding device includes a vibration system for vibrating sound, a magnetic circuit system for driving vibration of the vibration system, a conductive element feeding the vibration system, a fixed element for assembling vibration system, magnetic circuit system and conductive element. Wherein, the vibration system includes a diaphragm, a voice coil and a skeleton between the diaphragm and the voice coil. The skeleton can not only adjust the position of the voice coil in the vibration direction, but also improve the symmetry of the vibration amplitude.

However, in the related art, the provision of the skeleton increases the number of parts of the sounding device, thereby increasing the manufacturing cost and the assembly process. And the heavier skeleton increases the overall weight of the sounding device.

Therefore, it is necessary to provide an improved sounding device to solve the above problems.

SUMMARY OF THE PRESENT DISCLOSURE

In the related art, setting the skeleton increases the manufacturing difficulty and manufacturing cost of the sounding device. The present disclosure provides a sounding device with a simple structure and good reliability.

Accordingly, the present disclosure provides a sounding device. The sounding device includes a vibration system, a magnetic circuit system, a conductive element and a fixed element. The vibration system includes a diaphragm and a voice coil fixed to the diaphragm. The voice coil is a cylindrical structure with hollow structure surrounded by voice coil wire. The connection part is adjacent to and spaced apart from the voice coil. The diaphragm consists of a dome part and a suspension around the dome part. The dome part includes a dome body and a protruded platform of the dome extending from the dome body to the voice coil and fixed to the voice coil. The sounding device also includes a reinforcement element for fixing the voice coil and the connection part.

Further, the reinforcement element includes a first reinforcement part fixed to the upper surface of the connection part or the lower surface of the connection part, and a second reinforcement part fixed to the outer side surface of the voice coil.

Further, the reinforcement element is fixed to the voice coil and the connection part through glue.

Further, the reinforcement element is distributed around the voice coil.

Further, the connection part includes a plurality of sub-connection parts; at least one sub-connection part is directly connected to the end part of voice coil wire, and at least one sub-connection part is not directly connected to the end part of voice coil wire.

Further, the voice coil is a rectangular column with four rounded corners, and the reinforcement element is disposed corresponding to the rounded corners of the voice coil.

Further, the dome body includes a central area located at the center and a fixed area fixed to the suspension; and the dome is located between the central area and the fixed area.

Further, the protruded platform of the dome includes a plurality of spaced sub-protruded platforms; the adjacent sub-protruded platforms form an avoidance gap on a side of the dome body close to the voice coil to avoid the voice coil wire.

Further, the protruded platform of the dome includes a bottom wall fixed to the voice coil; an opening that connects the bottom wall with the side wall of the dome body and is enclosed by the side wall and is opposite to the bottom wall.

Further, the conductive element further includes a peripheral part connected to the fixed element, and an elastic arm part connecting the peripheral part and the connection part.

Compared with the related art, the present disclosure provides a protruded platform of the dome integrated with the dome body on the dome part. The skeleton structure is replaced, the assembly process of the skeleton is reduced, and the weight of the sounding device is reduced. The reinforcement element is provided, so that the voice coil and the conductive element, which are originally only connected by the voice coil wire, have a more stable connection relationship, which prevents the separation of the voice coil and the conductive element, which increases the reliability of the sounding device.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

Figure 1:
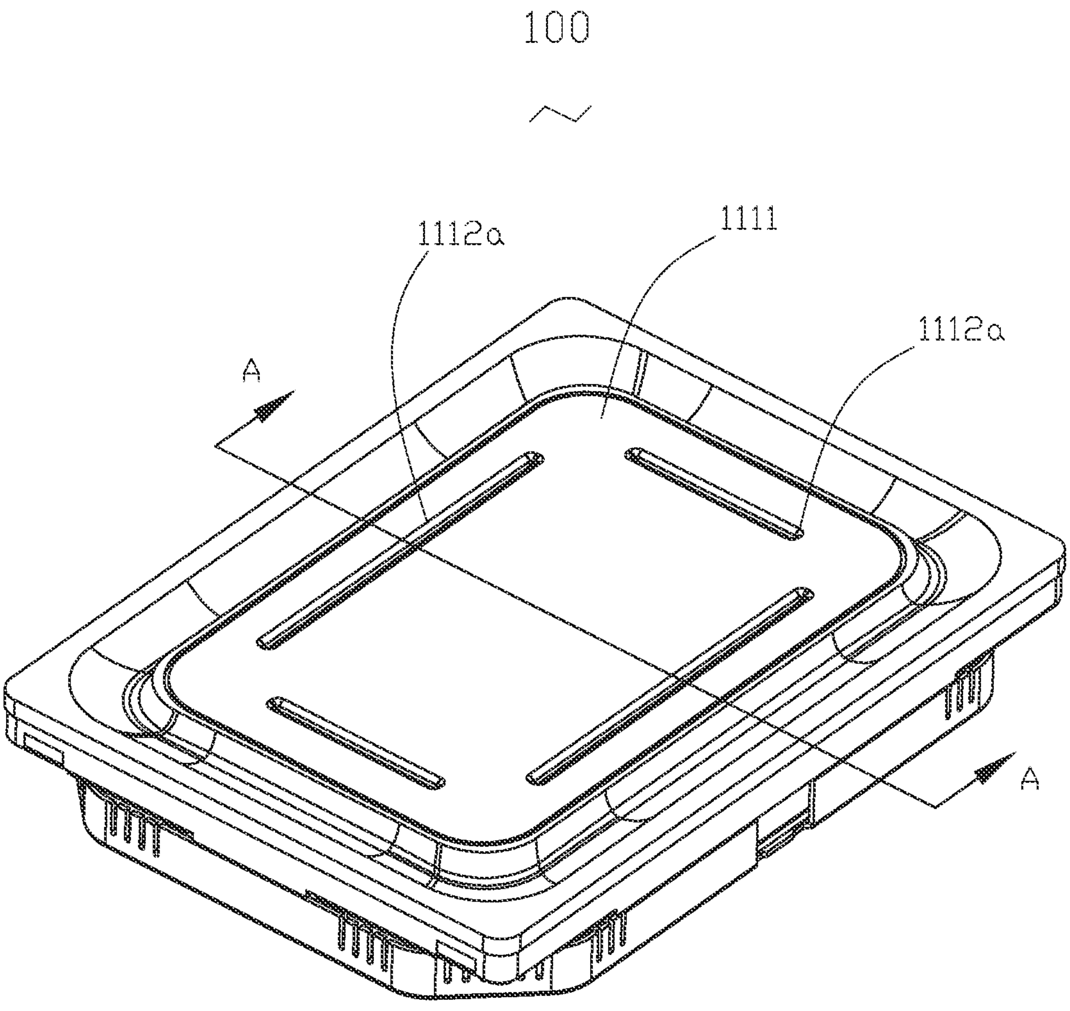
FIG. 1 is an isometric view of a sounding device provided by an exemplary embodiment of the present disclosure.

The present disclosure will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain the disclosure, not intended to limit the disclosure.

Referring to FIGS. 1-5, the present disclosure provides a sounding device 100, which includes a vibration system 1 for vibrating sound, a magnetic circuit system 2 for driving vibration of the vibration system 1, a conductive element 3 feeding vibration system 1, a fixed element 4 for assembling vibration system 1, magnetic circuit system 2 and conductive element 3.

As shown in FIGS. 1-2 and 4-5, the vibration system 1 includes a diaphragm 11 and a voice coil 12 fixed to the diaphragm 11. voice coil 12 is surrounded by voice coil wire. It is in the form of a column with a hollow structure, specifically a rectangular column with rounded corners. The voice coil 12 has an upper surface of the voice coil 121 facing the diaphragm 11 and an outer side surface of the voice coil 122 facing away from the hollow structure. The diaphragm 11 includes a dome part 111 and a suspension 112 around the dome part 111. The dome part 111 includes a dome body 1111 and a protruded platform of the dome 1112 extending from the dome body 1111 to the voice coil 12 and fixed to the upper surface of the voice coil 121. Wherein the dome body 1111 is perpendicular to the vibration direction of the diaphragm 11. The protruded platform of the dome 1112 extends approximately in the vibration direction of the diaphragm 11.

The dome body 1111 includes a central area 11111 at the center and a fixed area 11112 fixed with the suspension 112, and the protruded platform of the dome 1112 is located between the central area 11111 and the fixed area 11112. The protruded platform of the dome 1112 includes a plurality of spaced sub-protruded platforms of the dome 1112*a*. The adjacent sub-protruded platform of the dome 1112*a* forms an avoidance gap on the side of the dome body 1111 close to the voice coil 12 to avoid the voice coil wire. The protruded platform of the dome 1112 includes a bottom wall 11121 fixed with the voice coil 12, a side wall 11122 connecting the bottom wall 11121 and the dome body 1111, and an opening 11123 enclosed by side wall 11122 and opposite bottom wall 11121. The dome body 1111 and the protruded platform of the dome 1112 are integrally formed.

Figure 2:
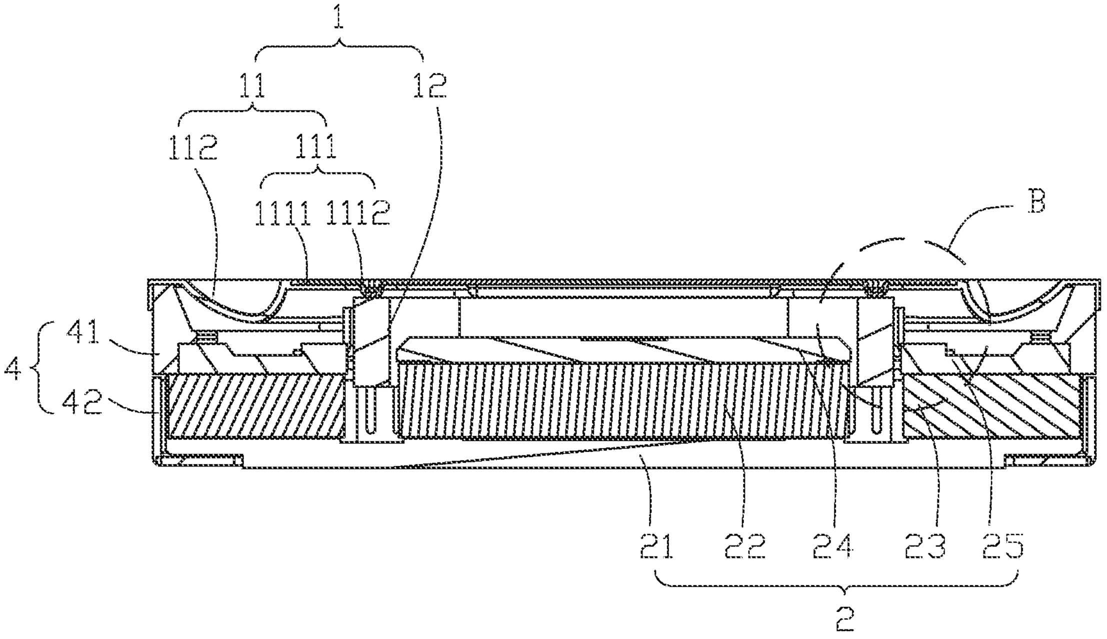
FIG. 2 is a cross-sectional view of the sounding device taken along line AA in FIG. 1.

As shown in FIG. 2, the magnetic circuit system 2 includes a lower clamping board 21, a main magnet 22 stacked on the middle position of the lower clamping board 21, an auxiliary magnet 23, which is stacked on the periphery of the lower clamping board 21, a main pole core 24 stacked on main magnet 22, an upper clamping board 25 stacked on the auxiliary magnet 23. The main magnet 22 and the auxiliary magnet 23 are spaced apart to form a magnetic gap into which the voice coil 12 is inserted.

Figure 3:
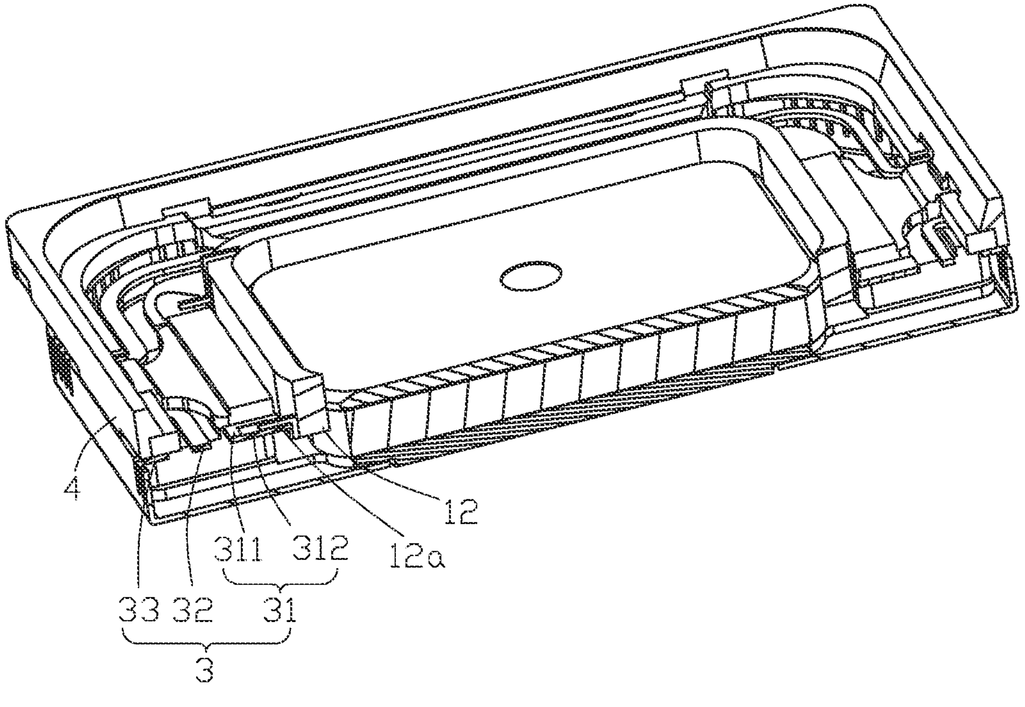
FIG. 3 is a cut-away view of the sounding device shown in FIG. 1.
Figure 4:
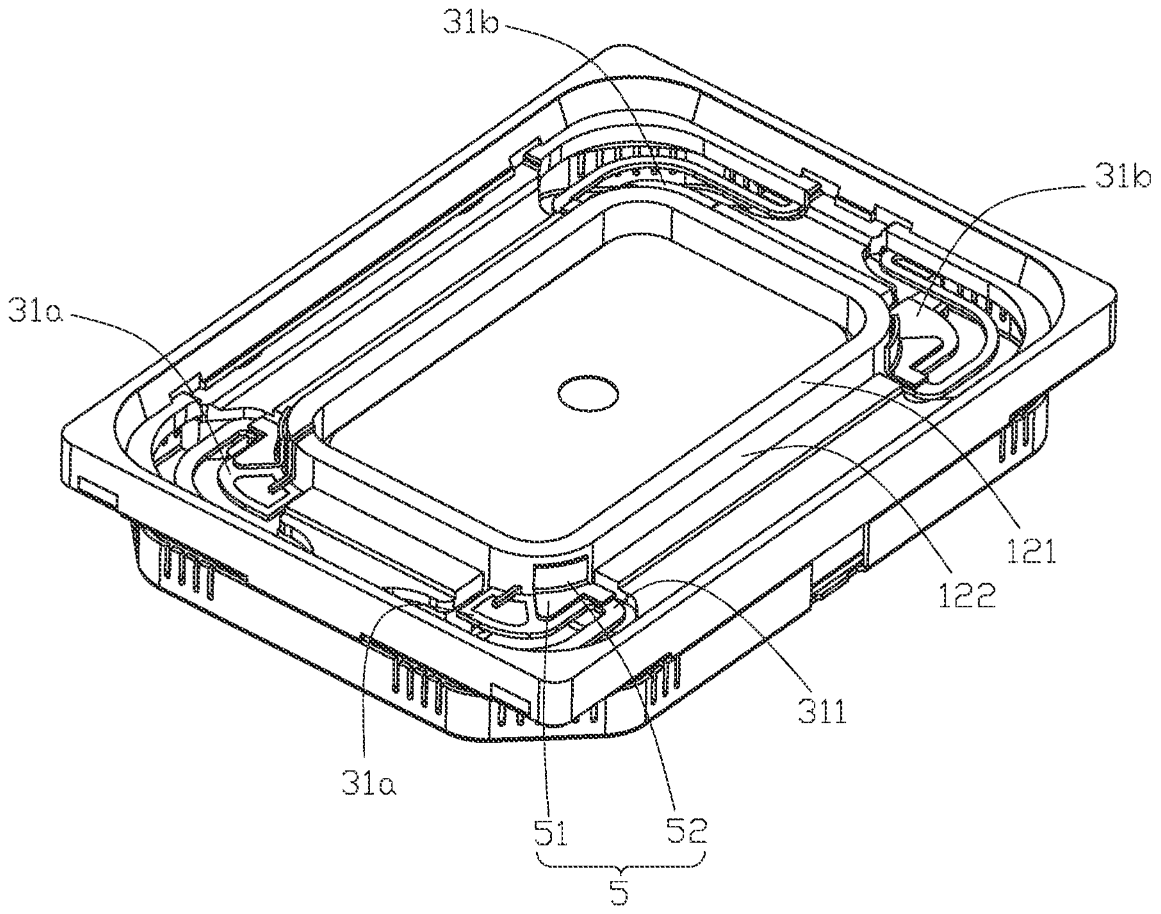
FIG. 4 illustrates an assembly of a reinforcement element, a voice coil and a conductive element of the sounding device.
Figure 5:
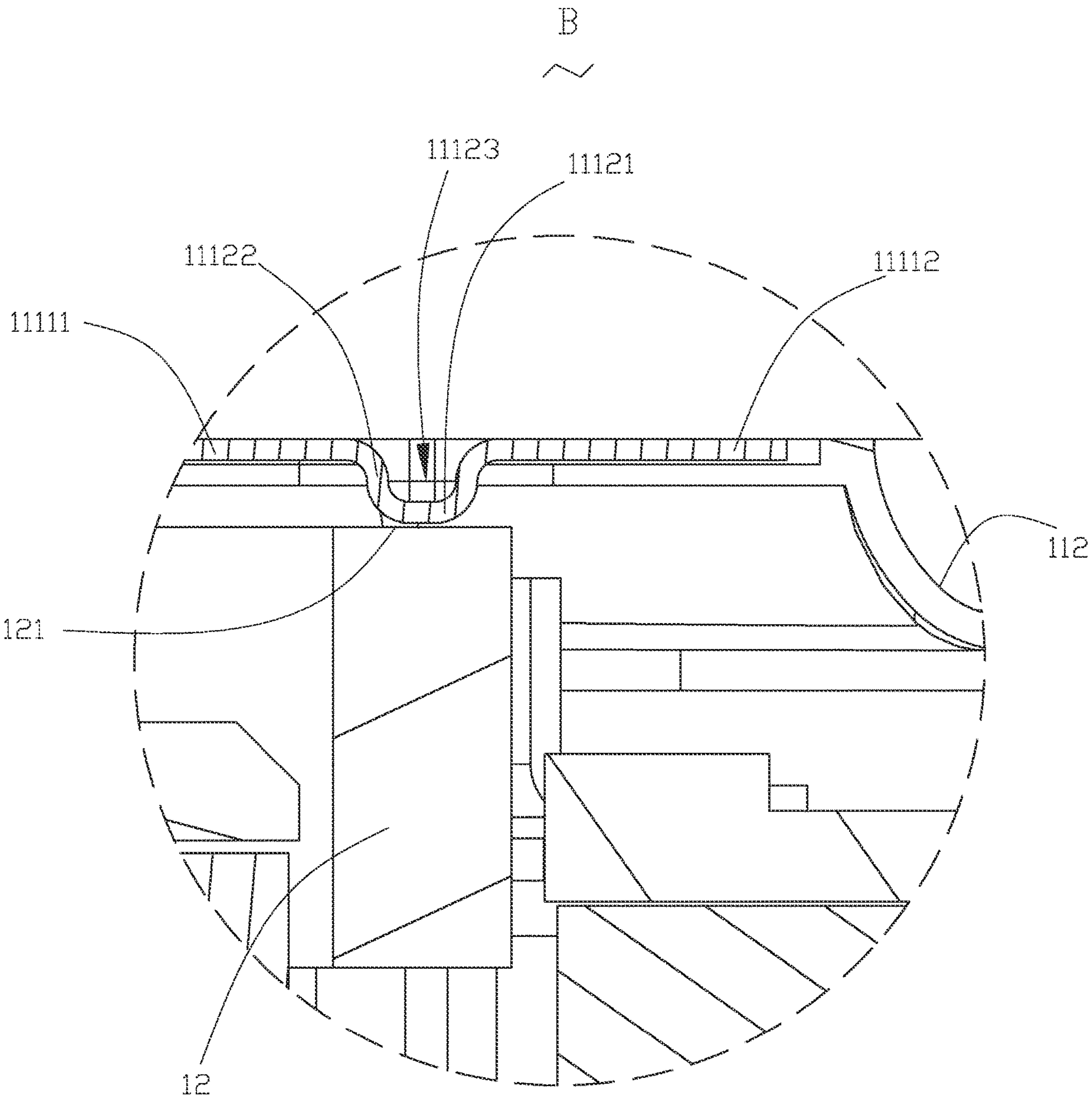
FIG. 5 is a partially enlarged view of the sounding device in FIG. 2.

As shown in FIGS. 3-4, the conductive element 3 is a flat flexible circuit board, including a connection part 31 for connecting with the voice coil 12, and a peripheral part 33 located outside the connection part 31, an arm part 32 connecting connection part 31 and peripheral part 33. The arm part 32 has the ability to deform. Wherein, peripheral part 33, arm part 32 and connection part 31 all include four separate parts. The connection part 31 includes two sub-connection parts 31*a* that are directly connected to the end part of voice coil wire 12*a* and two sub-connection parts 31*b* that are not directly connected to the end part of voice coil wire 12*a*.

As shown in FIG. 2, the fixed element 4 includes a frame 41 and a steel cover 42 connected to the frame 41. The frame 41 and the steel cover 42 cooperate to form a frame with a containment space.

As shown in FIG. 4, the reinforcement element 5 is an L-shaped steel sheet, including a first reinforcement part 51 and a second reinforcement part 52 which are connected to each other.

As shown in FIGS. 3-4, after assembly, vibration system 1, magnetic circuit system 2, and conductive element 3 are all accommodated and fixed in the fixed element. The conductive element 3 is opposite to the diaphragm 11. The peripheral part 33 of the conductive element 3 is fixed with the frame 41 to support the arm part 32 and the connection part 31. The four connection parts 31 of the conductive element 3 are spaced apart outside the rounded corners of the voice coil, and are adjacent to and spaced apart from the outer side surface of the voice coil 122.

The connection part 31 has an upper surface of the connection part 311 facing the diaphragm 11 and a lower surface of the connection part 312 facing away from the diaphragm 11. The end part of the voice coil wire 12*a* is connected to the upper surface of the connection part 311 or the lower surface of the connection part 312. The reinforcement element 5 is fixed by the glue, the voice coil 12 and the connection part 31 at the rounded position of the voice coil 12. Specifically, the first reinforcement part 51 is fixed to the upper surface of the connection part 311, and the second reinforcement part 52 is fixed to the outer side surface of the voice coil 122.

In other embodiments, the first reinforcement part 51 can also be fixed to the lower surface of the connection part 312, while the second reinforcement part 52 is fixed to the outer side surface of the voice coil 122.

In other embodiments, reinforcement element 5 may also include other parts than first reinforcement part 51 and second reinforcement part 52, i.e., not limited to the 1-shape.

In other embodiment, reinforcement element 5 can also be made of other materials than steel, i.e., not limited to steel sheet.

In other embodiments, the reinforcement element 5 can also be fixed to the voice coil 12 and the connection part 31 by other means, such as welding.

In other embodiment, the number of the connection part 31 and the number of the reinforcement element 5 is not limited to four, as long as they can be arranged at intervals around the voice coil 12 and ensure the symmetry of the vibration of the diaphragm 11

In other embodiments, the voice coil 12 may be of other shapes than a rectangular column, such as a cylindrical shape.

In other embodiment, the protruded platform of the dome 1112 can be a ring structure without breakpoints, that is, no avoidance gap needs to be set.

In other embodiment, the peripheral part 33, the arm part 32 and the connection part 31 of the conductive element 3 can all be integrated structures.

The present disclosure provides a protruded platform of the dome 1112 integrated with the dome body 1111 on the dome part 111. The skeleton structure is replaced, the assembly process of the skeleton is reduced, and the weight of the sounding device is reduced. The reinforcement element 5 is provided so that the voice coil 12 and the conductive element 3 which are originally only connected by the voice coil wire have a more stable connection relationship. which prevents the separation of the voice coil 12 and the conductive element 3, which increases the reliability of the sounding device.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the disclosure to the full extent indicated by the broad general meaning of the terms where the appended claims are expressed.

What is claimed is:

1. A sounding device, including:

a vibration system having a diaphragm and a cylindrical voice coil with an upper surface facing the diaphragm and an outer side surface away from a center of the voice coil, the voice coil being wound by lead wires for forming the cylinder with a hollow center;

a magnetic circuit system for driving the vibration system;

a conductive element for feeding the vibration system, including at least a connection part opposite to the diaphragm and spaced apart from the outer side surface of the voice coil;

a reinforcement element for fixing the voice coil and the connection part;

a fixed element for assembling the vibration system, the magnetic circuit system and the conductive element; wherein the connection part has an upper surface facing the diaphragm and a lower surface away from the diaphragm one of which is connected to a voice coil wire of the voice coil; and the diaphragm includes a dome part and a suspension around the dome part; the dome part includes a dome body and a protruded platform extending from the dome body to the voice coil and fixed to the upper surface of the voice coil;

wherein the sounding device includes multiple reinforcement elements which are distributed evenly around the voice coil and the reinforcement elements are spaced apart the dome part.

2. The sounding device as described in claim 1, wherein the reinforcement element includes a first reinforcement part fixed to the upper surface of the connection part or the lower surface of the connection part, and a second reinforcement part fixed to the outer side surface of the voice coil.

3. The sounding device as described in claim 1, wherein, the reinforcement element is fixed to the voice coil and the connection part through glue.

4. The sounding device as described in claim 1, wherein, the connection part includes a plurality of sub-connection parts; at least one sub-connection part is directly connected to the end part of voice coil wire, and at least one sub-connection part is not directly connected to the end part of voice coil wire.

5. The sounding device as described in claim 1, wherein the voice coil is a rectangular column with four rounded corners, and the reinforcement element is disposed corresponding to the rounded corners of the voice coil.

6. The sounding device as described in claim 1, wherein, the dome body includes a central area located at the center and a fixed area fixed to the suspension; and the dome is located between the central area and the fixed area.

7. The sounding device as described in claim 1, wherein, the protruded platform of the dome includes a plurality of spaced sub-protruded platforms; the adjacent sub-protruded platforms form an avoidance gap on a side of the dome body close to the voice coil to avoid the voice coil wire.

8. The sounding device as described in claim 1, wherein, the protruded platform of the dome includes a bottom wall fixed to the voice coil; an opening that connects the bottom wall with the side wall of the dome body and is enclosed by the side wall and is opposite to the bottom wall.

9. The sounding device as described in claim 1, wherein, the conductive element further includes a peripheral part connected to the fixed element, and an elastic arm part connecting the peripheral part and the connection part.

* * * * *